Nov. 19, 1940. W. D. CHILTON 2,222,528
TRIM MATERIAL CUTTER
Filed Nov. 3, 1939 2 Sheets-Sheet 2
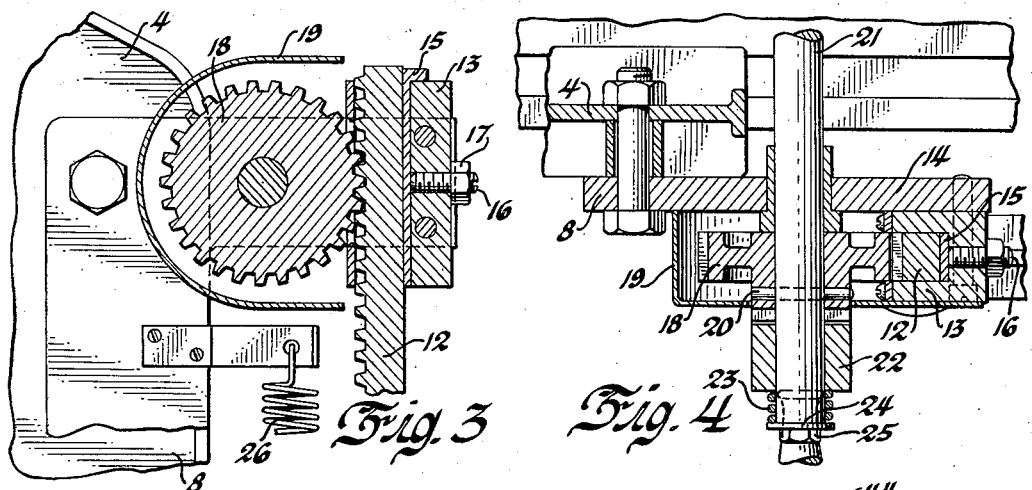
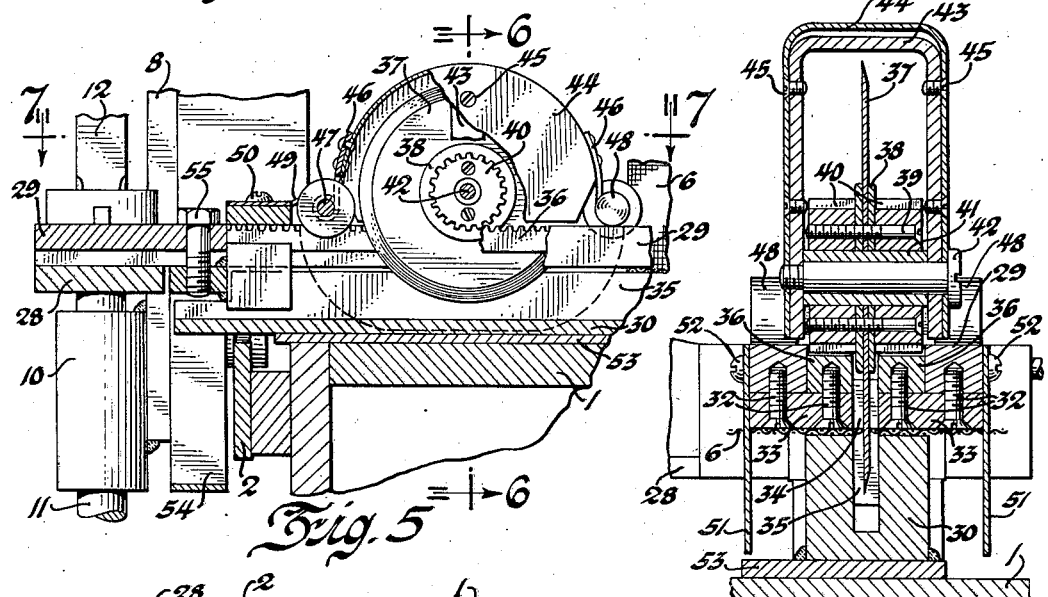
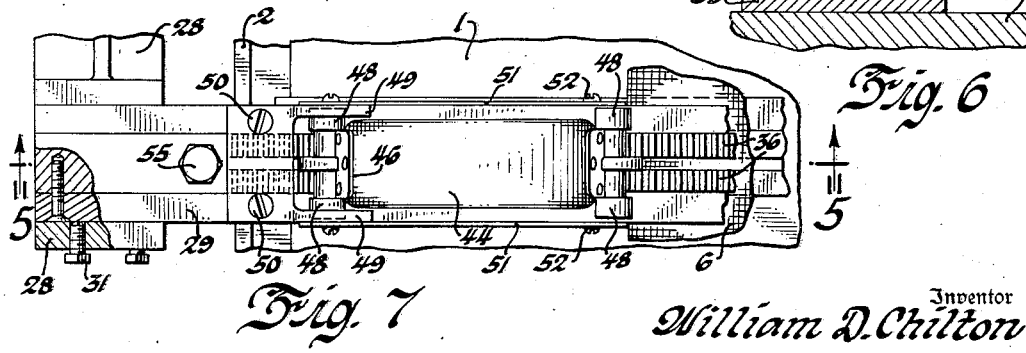
Inventor
William D. Chilton Patented Nov. 19, 1940

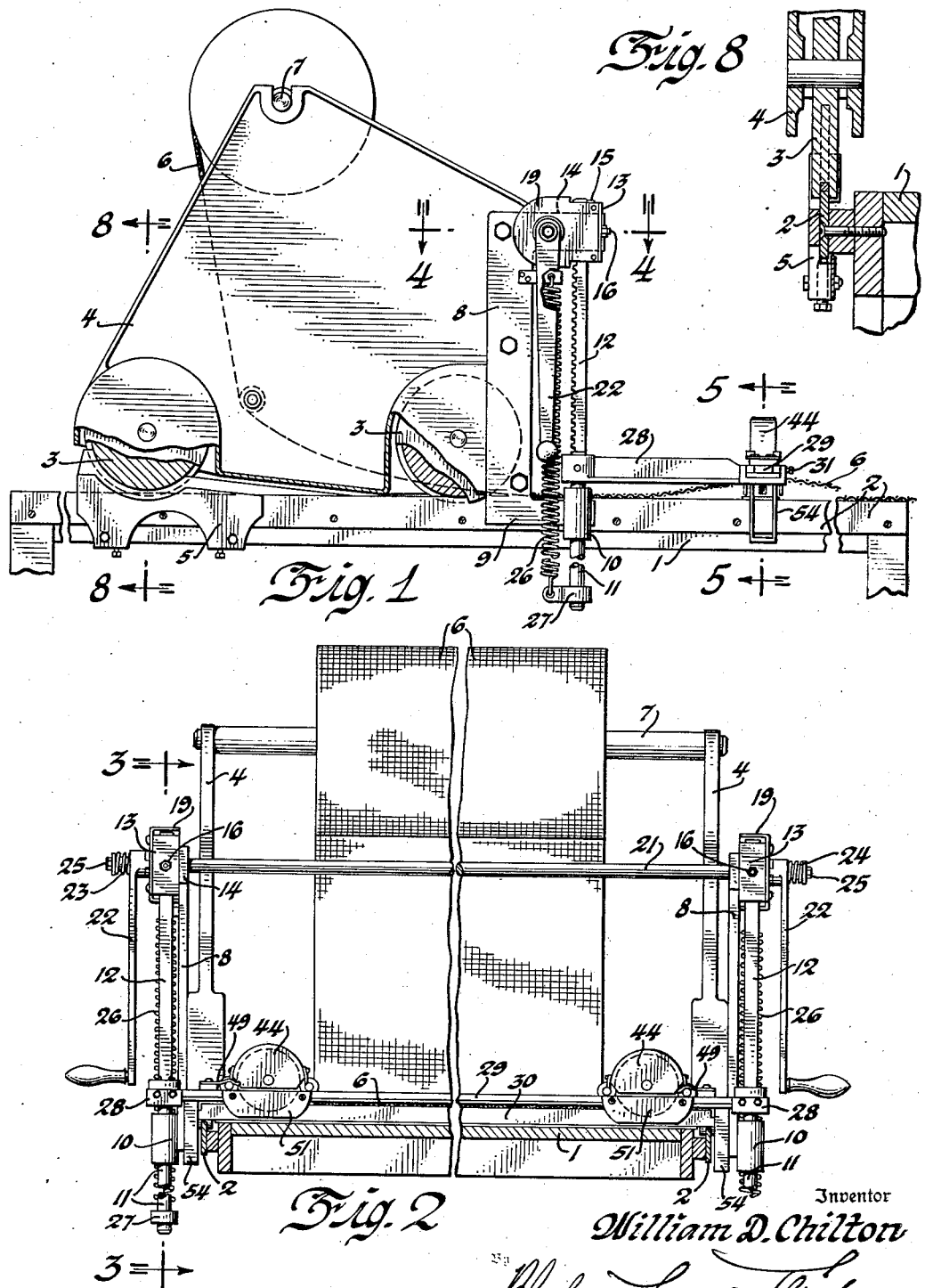

2,222,528

UNITED STATES PATENT OFFICE 2,222,528

TRIM MATERIAL CUTTER

William D. Chilton, Detroit Mich., assignor to General Motors Corporation, Detroit, Mich., a corporation of Delaware Application November 3, 1939, Serial No. 302,651

5 Claims. (Cl. 164—77)

This invention relates to apparatus for cutting pieces of given length from sheet stock. It is used, for example, in the large scale production of automobile bodies for cutting trim cloth into proper length.

An object of the invention is to provide a machine which reduces waste of material and insures clean cuts and greater accuracy in the size of the pieces, together with savings in time, labor and mental effort.

A further object of the invention is to provide an improved cloth clamping and cutting knife arrangement whereby severance of the pieces is effected by a fast cutting through the material as distinguished from the usual shearing action between cutter bars. To this end the cloth sheet is gripped on opposite sides of a selected line of severance and between a pair of clamping bars, one of which constitutes a track for a circular knife having a pinion engaging a toothed rack for rotating the knife incident to its travel on the track and its passage through the cloth suspended in its path.

Additional objects and advantages will become apparent during the course of the following specification having reference to the accompanying drawings wherein Figure 1 is a side elevation of the device; Figure 2 is a front elevation looking toward the left in Figure 1; Figure 3 is an enlarged detail sectional view taken on line 3—3 of Figure 2; Figures 4 and 5 are sectional views taken on lines 4—4 and 5—5 of Figure 1, respectively; Figure 6 is a transverse section taken on line 6—6 of Figure 5; Figure 7 is a top plan view looking in the direction of the arrows on line 7—7 of Figure 5 and Figure 8 is a detail section on line 8—8 of Figure 1.

The machine is intended to be supported upon the bed 1 of a worktable of suitable size having along its opposite sides the rail strips 2 forming tracks on which the machine may be shifted lengthwise of the table to accommodate variations in the length of pieces of the trim cloth to be cut. Riding on the tracks 2 are the grooved wheels 3 mounted in the four corners of the carriage 4. The rearmost carriage wheels are shown in Figure 1 resting in an adjustable wheel chock 5 which locates the carriage in selected position on the table. The chock block is fastened to the rail 2 by suitable set screws (see Figure 8) and may be shifted to selected locations on the track depending upon the length of the pieces. The trim cloth 6 is supplied in rolls and for the sake of simplicity only one roll is shown in the drawings mounted in the carriage by means of the axle 7. However the carriage may be constructed so as to support two or more rolls of raw material and the several superposed sheets of trim cloth may be fed through the machine at the same time for cutting more than one piece in the one operation.

On each side of the carriage 4 is bolted a U-shaped bracket 8, the lower leg 9 of which has welded thereto a cylindrical bushing or sleeve 10 slidably receiving a vertical post 11 forming a part of an adjustable cutter assembly. Extending upwardly and forming a part of the post 11 is a toothed rack 12 having a bearing at its upper end in a box 13 which is bolted to the upper leg 14 of the bracket 8. A gib or friction shoe 15 (see Figure 3) is carried within the box 13 for engagement with the back of the rack 12 and provision for adjustment of the sliding contact is provided by means of a set screw 16 threaded through the block into engagement with the gib 15 and provided with a jam nut 17. The gib not only insures proper mesh of the rack with its operating gear 18 but also offers frictional resistance to accidental displacement of the cutter assembly from any selected position of vertical adjustment. A protective guard 19 encloses the gear 18.

The gear 18 on each side of the machine is fastened as by means of a pin 20 (see Figure 4) to a shaft 21 which runs from one side to the other of the machine and insures operation of the gears in unison. Mounted on opposite ends of the equalizing shaft 21 are the hand cranks 22, each of which has a clutch tooth to engage within a radial groove in the adjacent face of one of the gears 18. A coil spring 23 surrounding the end of the shaft 21 and held by a washer 24 and stud 25 bears against the hub of the crank 22 for releasably maintaining clutch engagement of the crank and associated gear. As will be readily understood, rotation of one or the other of the hand cranks through the gear and rack will raise or lower the cutter assembly with reference to the table bed 1. For counterbalancing the weight of the assembly and assist in maintaining the parts in adjusted position use may be made of a coil spring 26 fastened at one end to the bracket 8 and at its other end to a collar 27 on the lower end of the slider rod 11.

Each slider rod 11 has projecting forwardly therefrom a rigid arm 28 terminating in an upwardly opening pocket in which is fitted an adjacent end of one of a pair of cloth clamping bars 29 and 30, respectively. The opposite ends of the uppermost clamping bar 29 are removably secured in the supporting arms 28 by means of set screws 31. As shown in the drawings this upper clamping bar 29 may for convenience of manufacture be formed of a number of rails fastened together by means of screw studs 32 as best seen in Figure 6. The lowermost rails 33 of the upper bar 29 are spaced apart to provide a knife receiving recess 34 which is aligned with a cooperating recess or channel 35 in the lowermost clamping bar 30. Secured on top of the rails 33 are the spaced rails 36 having their upper surfaces toothed to form a pair of racks extending from one side to the other of the machine on both sides of the knife receiving groove. The cutter knife assembly which is guided by and rides along the top of the uppermost clamping bar 29 is best shown in Figures 5 and 6. In the event the cloth to be operated upon is unusually wide two knife assemblies may be provided, one operated from each side of the table as seen in Figure 2. Each knife assembly includes a circular cutter disk 37 clamped between a pair of stiffening disks 38 by the screws 39 which also secure on opposite sides of the cutter disk the gear pinions 40 which are in mesh with the teeth of the rack bars 36. This assembly of knife and gears has a hub sleeve 41 in which is mounted a pin 42 for supporting a guard and hand grip. The hand grip includes a U-shaped strap 43 and a sheet metal cover 44 of semi-circular shape secured to the strap 43 by screws 45. On opposite sides the casing 44 has riveted thereto the straps 46 having curled ends in each of which is mounted an axle 47 for the guide rollers 48. For holding the knife in inoperative position at the end of the track a spring fork 49 is provided to hook over the adjacent pair of rollers 48 and is anchored to the top of the clamping bar 29 by screws 50. In the inoperative position of the knife protection against injury when the clamping bars are separated, is provided by means of guard plates 51 secured by screws 52 to the upper bar 29.

As best seen in Figure 6 the lower clamping bar 30 having its bearing plate 53 resting on the table top 1 securely clamps the sheet 6 against the underside of the topmost bar 29 with a sheet portion suspended across or bridging the knife receiving recesses 34 and 35. With the parts in the relation shown the movement of the knife assembly across the track will cause the circular knife 37 to cut into the suspended cloth as the knife rotates by reason of the rack and pinion engagement and thereby make a clean cut. After the cutting operation is complete the operator or operators, by rotation of the hand crank 22, will first lift the uppermost clamping bar 29 separating it from the lower bar 30. Continued elevation of the supporting arms 28 will thereafter raise the lower bar 30 from the table and allow the severed piece to drop below the clamping bar 30. In order that the bars may first be separated and then moved in unison a lost motion connection therebetween is provided in the form of a looped hanger or keeper 54, the upper end of which is secured by a stud 55 to the upper clamping bar 29 with the dependent loop slidably receiving the adjacent end of the lower clamping bar 30.

With the parts in elevated position, the cloth 6 may be pulled through the open space between the bars 29 and 30 to the proper marking on the table top and in superposed relation to the previously severed piece. Thereafter operation of the hand crank will lower the parts until the clamping bar 30 rests on the edge portion of the previously cut piece arresting its motion to cause closure of the bars upon further descent of the upper bar 29 for clamping the material between the bars and a repetition of the knife operation as previously described. By reason of the vertical adjustment of the cutter assembly the relation of distance remains the same regardless of the height of the stack of pieces cut from the stock.

I claim:

1. In a cloth cutting machine of the character described, a table for supporting a stack of cloth pieces cut to length, a pair of separable cloth clamping bars supported above the table, means to raise and lower the bars in relation to the height of the stack of cloth pieces, a rack on one of the bars and a rotary cloth cutter having a gear engageable with the rack for rotating the cutter as it moves along the bars.

2. In a machine for cutting sheet material, a pair of spaced rails adapted to receive a knife disk therebetween, a clamp bar cooperating with said rails to hold a portion of the sheet material in bridging relation to the space between the rails and a keeper carried by said rails and slidably mounting the clamp bar for movement to and from said rails.

3. In a machine for cutting sheet material to given length, a bed for supporting a stack of cut sheets, a cutter track above the bed, means supporting the track adjustably for raising and lowering the same in accordance with the height of the stack, a clamping bar cooperating with the track to hold the sheet on both sides of the line of severance, keepers carried by the track and slidably mounting the bar thereon for the separation of the bars from the track and a knife mounted to ride on said track to sever the sheet.

4. In a machine of the character described, a pair of clamping bars operatively connected together for opening and closing movements in relation to a sheet passed therebetween, a vertical adjustment means connected to one of the bars, means arranged to provide bottoming abutments for the other bar upon descent of the bars for a closing movement of the bars and a clamping action on the sheet, a knife receiving recess in both bars at the sheet clamping surfaces thereof and a knife tracking on one of the bars for travel in said recess.

5. In a cloth cutting machine of the character described, a table for supporting a stack of pieces cut to length, a pair of separable cloth clamping bars supported above the table to grip between them the material to be cut at a level substantially corresponding to the height of the stack, means to raise the clamp bars progressively as the height of the stack increases and a cutter knife mounted on the bars for severing the material gripped thereby.

WILLIAM D. CHILTON.